(No Model.) 3 Sheets—Sheet 1.
W. D. ROBINSON.
MAGAZINE CAMERA.

No. 536,820. Patented Apr. 2, 1895.

WITNESSES:
N. E. Paige
J. Norman Dixon

INVENTOR
Wm. D. Robinson,
By his Attorneys,
Wm. C. Strawbridge
J. Bonsall Taylor (No Model.) 3 Sheets—Sheet 2.

W. D. ROBINSON.
MAGAZINE CAMERA.

No. 536,820. Patented Apr. 2, 1895.

WITNESSES: A. E. Paige. F. Norman Dixon.

INVENTOR Wm. D. Robinson, By his Attorneys, Wm. C. Strawbridge J. Bonsall Taylor (No Model.) 3 Sheets—Sheet 3.
W. D. ROBINSON.
MAGAZINE CAMERA.
No. 536,820. Patented Apr. 2, 1895.
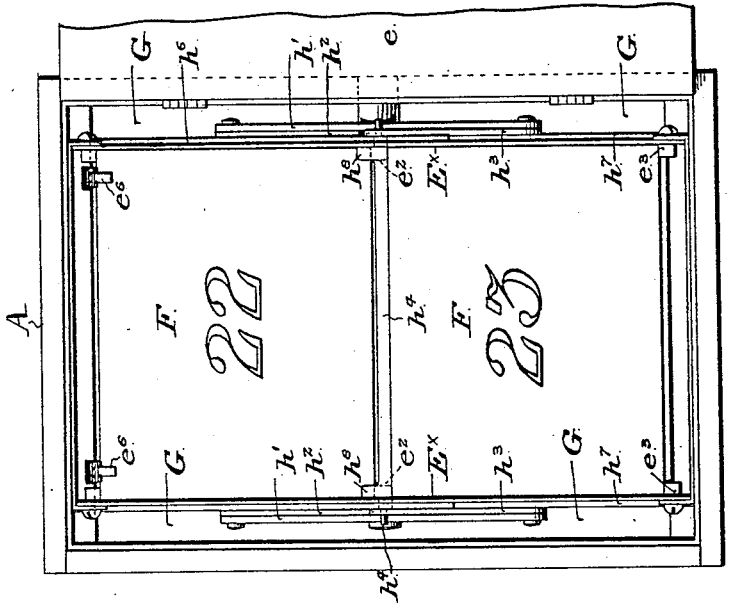
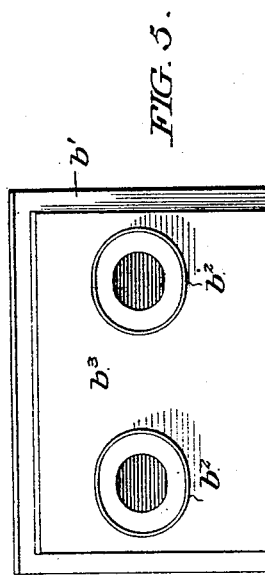
WITNESSES:

UNITED STATES PATENT OFFICE.

WILLIAM DUFFIELD ROBINSON, OF PHILADELPHIA, PENNSYLVANIA.

MAGAZINE-CAMERA.

SPECIFICATION forming part of Letters Patent No. 536,820, dated April 2, 1895.

Application filed August 1, 1894. Serial No. 519,182. (No model.)

*To all whom it may concern:*

Be it known that I, WILLIAM DUFFIELD ROBINSON, a citizen of the United States, residing in the city and county of Philadelphia, in the State of Pennsylvania, have invented certain new and useful Improvements in Magazine-Cameras, of which the following is a specification.

My invention relates in general to photographic cameras adapted to be loaded or supplied with a large number of prepared plates or films, and in which provision is made for the manipulation from the exterior of the casing and the successive exposure of fresh plates until all have been exposed.

The object of the invention is such a construction of the magazine and of the plate-manipulating mechanism as will permit of the simultaneous movement of an exposed plate away from the exposing chamber and of an unexposed plate toward the exposing chamber in such manner that each of the said plates so moved will take its appropriate position in a given stack, tier, or series of plates,—and as will, moreover, permit of the selection of any particular plate of the entire series for exposure.

Other objects of the invention and incidental advantages inhering in it, are hereinafter referred to.

In the accompanying drawings I have represented and hereinafter I have described a good form of camera embodying my improvements, the particular subject-matter claimed as novel being hereinafter definitely specified.

Figure 1:
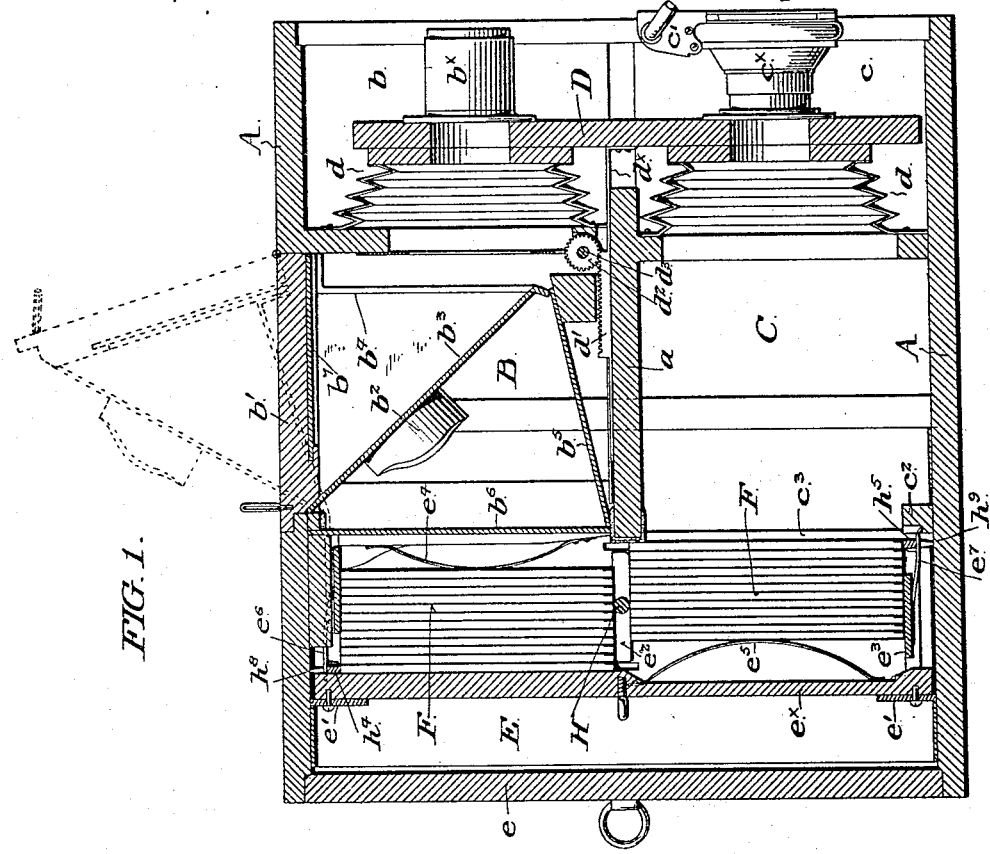
Figure 2:
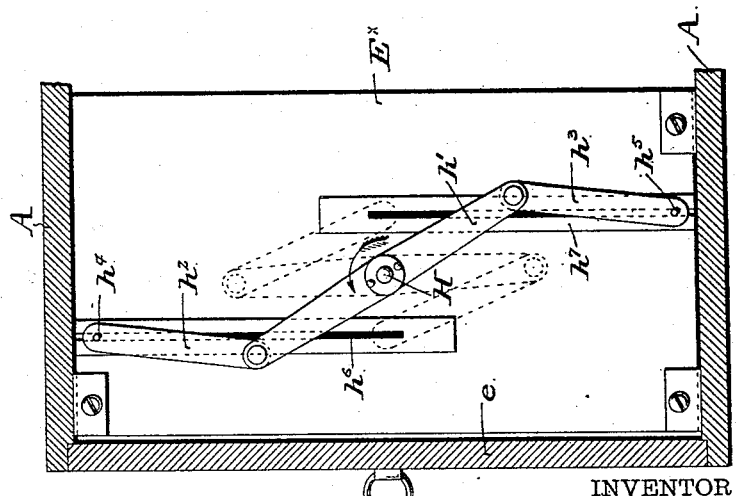
Figure 3:
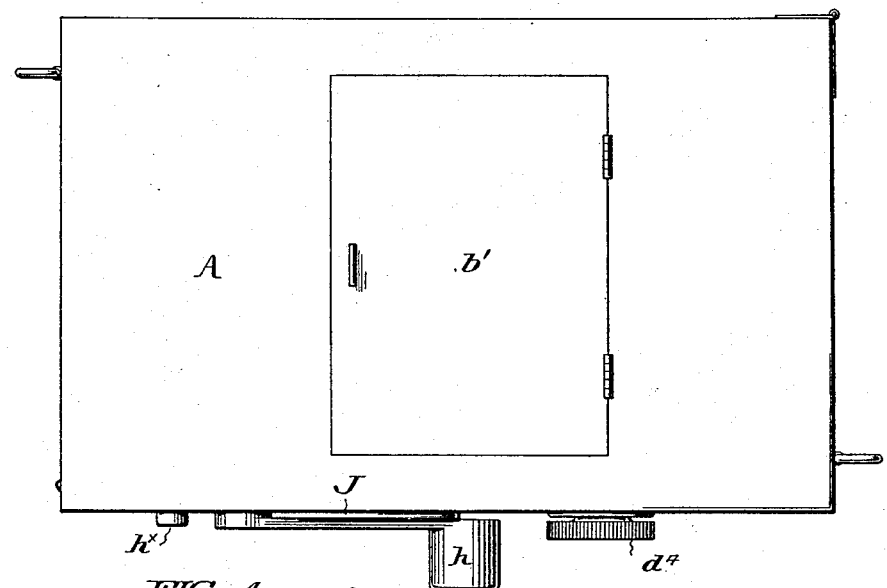
Figure 4:
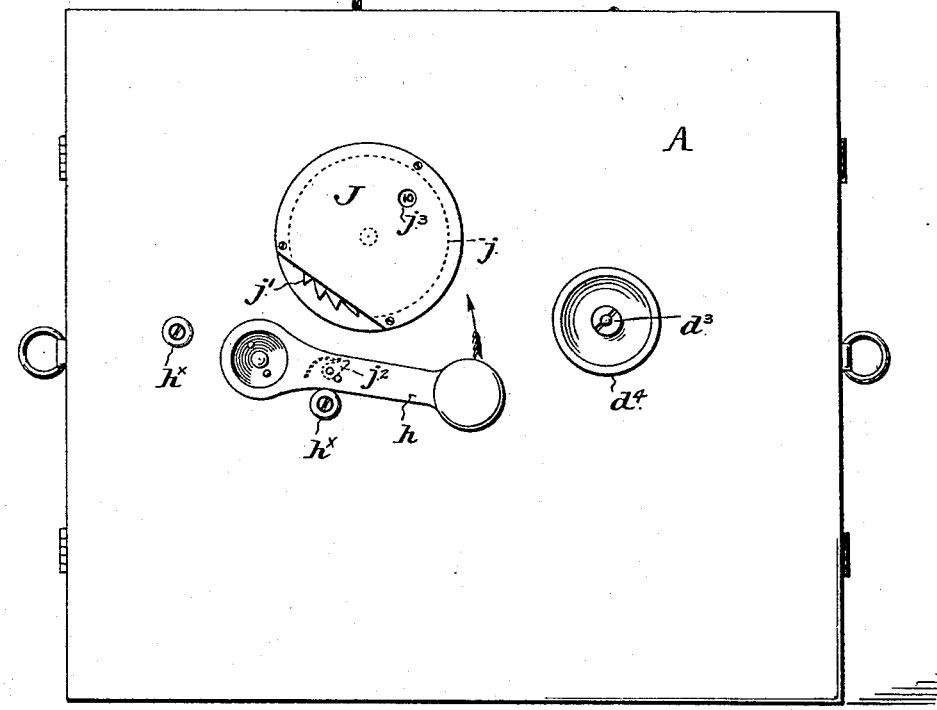

In the drawings, Figure 1 is a central, vertical, longitudinal, side, sectional, elevation through the camera embodying my improvements. Fig. 2 is a fragmentary, vertical, longitudinal, side, sectional, elevation through one of the lever compartments of the magazine, exhibiting a portion of the plate-manipulating mechanism. Fig. 3 is a top plan view of the camera represented in Fig. 1; Fig. 4, a side elevational view of the same. Fig. 5 is a rear elevational view of the camera represented in Fig. 1, with the lid of the finder compartment elevated and the door of the magazine open to expose the lever compartments and the false back of the magazine. Fig. 6 is a similar view with the cover of the finder compartment closed and the false back removed to exhibit the plates in place within the magazine.

Similar letters of reference indicate corresponding parts.

In the accompanying drawings, A represents a casing of any preferred construction, the height of which is a little in excess of that of two plates placed one above the other, and the width of which is a little in excess of the width of the plates. The front portion of the casing is longitudinally centrally divided by a horizontal floor or partition, $a$, into two compartments, the upper of which, B, contains the finder mechanism and is termed by me the "finder compartment," and the lower of which, C, is the exposing compartment.

Each of the foregoing compartments is extended in the direction of the lens-provided front of the casing to form what may be termed lens-chambers, of which, $b$, is the chamber of the focusing-lens $b^x$, and $c$ the chamber of the camera-lens $c^x$.

D is a lens-board to which the foregoing lenses are applied, and which extends vertically within both lens-chambers and is connected in any preferred manner, as, for instance, by means of bellows $d\,d$, with the front portions of the finder and exposing compartments respectively, in the manner shown in Fig. 1. The lens-board is additionally supported and carried by means of a carrying plate $d^x$ which extends in any preferred manner inward, conveniently along the floor of the partition $a$, and is at its inner portion provided with a rack bar $d'$, which is suitably guided and stayed, and with the teeth of which is engaged a toothed-pinion $d^2$, the shaft $d^3$ of which is suitably journaled and extended through one side of the casing and upon its outer protruding end is provided with a thumb wheel $d^4$ by the rotary movement of which, through the intervention of the rack and pinion, the carrying plate is moved in or out and the lens-board and lenses moved in unison.

$b'$ is a hinged lid or cover to the finder compartment, to which the eye-pieces $b^2$ of the finder mechanism are connected by an obliquely-disposed eye-piece-supporting plate $b^3$, the lower portion of which is conveniently maintained by stay rods $b^4$, as shown in Fig.

1. The under surface of the hinged lid is also provided with a mirror $b^7$, as shown in Fig. 1.

$b^5$ is a mirror inclined from the horizontal and fixed upon the floor of the finder compartment, and $b^6$ a preferably white reflecting surface which closes the finder compartment at its rear end and in conjunction with the mirrors $b^7$ and $b^5$ enables the photographer when the lid is raised into the position indicated in dotted lines in Fig. 1, to find his focus, and see reflected an upright and not inverted image, the exact counterpart of that impressed upon the exposed plate.

The camera-lens $c^x$ is provided with any usual or preferred form of shutter mechanism, a portion of a pneumatic mechanism of a well-known type being indicated by $c'$.

The exposing compartment C opens as to its rear or inner portion into the magazine compartment or magazine E, and the outline or boundary of its said inner opening is formed above by the inner end of the partition $a$, below by a transverse rib $c^2$ upon the floor of the compartment, and at the sides by vertical ribs or ledges $c^3$, against all of which members the plate,—or rather the plate-carrying frame, although I use the terms interchangeably, of the plate next to be exposed,—is caused to bear and held in position for exposure.

The magazine compartment E, hereinbefore referred to, within which the plates are stored and manipulated, is of the full height and width of the casing, and may be of any desired length so as to adapt it to contain any desired total number of plates. Within it the total number or series of plates, F, are assembled in two numerically equal vertically disposed stacks or sets, one above the other,—the plates of the lower stack facing the rear opening of the exposing compartment, and the plates of the upper stack facing the rear face of the reflecting surface of the finder compartment.

The magazine compartment is inclosed at the rear by a door $e$, and within said compartment are erected two inner or supplemental longitudinally-extending side walls $E^x$, of the full height and length of the compartment, parallel with each other, and serving by being respectively placed at a short distance from such portions of the respective side walls of the casing as constitute the side walls proper of the magazine,—to form two lateral but longitudinally-extending compartments, which I term the "lever compartments" G, which are dark compartments, and within which are respectively located the plate-manipulating mechanisms by means of which one plate of the upper stack, namely, that to the rear of said stack, and one plate of the lower stack, namely, that to the front of said stack, may be simultaneously transferred, the one from the upper portion to the lower portion, and the other from the lower portion to the upper portion, of the said magazine compartment,—and by means of which also said operation may be continuously repeated until every one of the plates of the entire series has in turn been presented to the exposing chamber.

Although I have represented in the drawings a series of twenty-four plates, twelve in the upper stack and twelve in the lower stack, it is to be understood that the proportions of the magazine compartment may be varied to admit any desired number of plates, all of which, as will be hereinafter understood, will be held tightly and compactly in their respective stacks.

Assuming the magazine adapted to contain a series of twenty-four plates,—the means by which the latter are maintained, interchanged, and successively exposed, are conveniently but not restrictively the following:—Each of the plates, of whatever material they may be composed, is preferably carried by a metal frame or rim, with or without a backing piece, and the contact of the frames of the series with each other is through their frames. Assuming the false back $e^x$ which fits within the magazine compartment between its supplemental side walls and serves, when secured by pivot catches $e'$ or similar retaining devices, to hold the two stacks of plates from the rear in position,—to have been removed, and the magazine door to have been opened,—the magazine is loaded by supplying to it, in preferably equal numbers, an upper stack of plates and a lower stack of plates, of which those of the upper stack rest upon longitudinal ledges $e^2$ formed upon or applied to the respective inside faces of the supplemental side walls, and those of the lower stack upon longitudinal ledges $e^3$ upon or near the floor of the compartment. A pair of bow springs $e^4$ bellying rearwardly conveniently from the rear face of the reflecting surface $b^6$, and lying respectively closely alongside of the supplemental side walls of the compartment, serve, by bearing on the side rims of the front plate frame of the upper stack, to press all of the frames of said stack together and hold them in position against the false back when in place,—while a similar pair of lower bow springs $e^5$, similarly applied to the lower side portions of the false back and bellying forwardly, serve to make contact with the side frames of the rear plate of the lower stack, and to press all of the frames of said stack together and maintain the front frame of said stack in contact with the inner opening of the exposing chamber, so that the front plate will be properly presented for exposure.

Assuming, now, the twelve upper plates and the twelve lower plates of the series of twenty-four plates represented, to be in the position explained, and illustrated in Fig. 1,—the problem of transferring the front plate of the lower stack after exposure to the upper portion of the magazine, and of similarly transferring the back plate of the upper stack to the lower portion of said magazine, so that each of said plates shall take the place of the other in the sense of filling the longitudinal vacancy occurring in each stack by reason of the said interchange or transfer of two plates, is conveniently but not restrictively effectuated by a lever mechanism of the following construction:

H is a rock shaft extending horizontally and transversely through the magazine compartment centrally of the length of the upper ledges $e^2$, and therefore between, and practically midway of, the upper and lower stacks of plates when in place. This shaft is suitably journaled in the supplemental side walls of the magazine, and one of its extremities passes completely through the side wall of the casing, and is exteriorly to said side wall conveniently provided with a crank handle $h$ by the movement of which the shaft is rotated in either direction within a range predetermined by crank stops $h^×$ on the casing. The shaft, as will now be understood, passes completely through one lever compartment, and it projects sufficiently into the other to be therein, as well as in the compartment first-named, provided with a lever or rocker arm $h'$,—the two rocker arms so applied being counterparts in dimensions and set with respect to each other and the shaft. The function of these rocker arms is, through the instrumentality of a pair of upwardly extending links $h^2$ attached to their respective upper ends, and a pair of downwardly extending links $h^3$ attached to their lower ends, to actuate to an intermittent, opposite, up-and-down, movement two bars, which I respectively term the "plate-depressing" bar $h^4$ and the (plate-lifting) bar $h^5$, and which extend transversely and horizontally through the magazine, the depressing bar in its upper portion and the lifting bar in its lower portion, and which respectively extend through, travel in, and are guided by, vertical slot-ways $h^6$ and $h^7$ formed in the supplemental side walls of the magazine,—their projecting extremities being respectively as to each bar pivotally engaged with one pair of the links of the rocker arm, as shown in Figs. 2 and 5. Obviously, the rotary movement of the rock shaft in the direction of the arrow in Fig. 2, will occasion such throw of the rocker arms and movement of their connected pairs of links as will cause the traverse of the plate-depressing bar from its normal upper position represented in full lines in Fig. 2, and the traverse of the lifting bar from its normal lower position similarly represented in Fig. 2, to the respective limits of their slot-ways, or to the positions indicated in dotted lines in said Fig. 2. It will also be observed that the slot-ways of the lifting bar are located in immediate adjacency to the vertical ribs or ledges $c^3$ at the rear of the exposing compartment, and that the slot-ways of the depressing bar are located in immediate adjacency to the inner face of the false back when in place, as shown in Fig. 1. By virtue of this particular disposition it will therefore be apparent that when the lifting bar has been depressed to its normal position below the level of the ledges $e^3$ for the lower plates, and when the depressing bar has been elevated to its normal position above the level of the uppermost rims or edges of the upper plates within the magazine compartment,—the lifting bar will, by virtue of the thrust of the bow springs, be immediately beneath the front plate of the lower stack, and the depressing bar immediately above the rear plate of the upper stack. When, then, the shaft is rotated through a given arc, and said lifting and depressing bars caused to perform their respective traverses the lifting bar will elevate the front plate of the lower stack to the upper portion of the magazine, and the depressing bar will simultaneously depress the rear plate of the upper stack to the lower portion of the magazine,—the plates in their respective simultaneous but reverse movements respectively temporarily compressing the lower and the upper bow springs which serve, as stated, to maintain the stacks compact.

Both the plate-lifting bar and the plate-depressing bar are in immediate adjacency to the inside faces of the slot-ways formed or provided each with a pair of wedge-shaped lugs $h^8$ $h^9$,—the lugs $h^8$ of the lifting bar facing downwardly, and the lugs $h^9$ of the depressing bar facing upwardly,—the function of which is, in the return traverses of the respective bars to their normal or first position, to insinuate themselves respectively in front of the then front plate of the lower stack, and behind the then rear plate of the upper stack, in order to make possible said return traverses by the temporary shifting, respectively backward and forward, of the respective stacks against the stress of the respective bow springs, and in order, moreover, to permit of the return of said bars to the positions necessary for action upon the respective next plates.

$e^6$ are a pair of spring plate-catches applied to the under face of the top or cover of the magazine compartment, the function of which, performed during the descent of the plate-depressing bar and the forcing down by it of the rear plate of the upper stack, is to spring down and in behind the next succeeding rear plate and retain the stack compact against the stress of the upper bow springs. In the rise of the plate-depressing bar the spring plate-catches are encountered by it and sprung upwardly clear of the stack. $e^7$ is a similar spring plate-catch, similarly operative in conjunction with the plate-lifting bar to, in the ascent of said bar with the first plate of the lower stack, retain the next succeeding front plate against the thrust of the plates behind it under the action of the lower bow springs.

It will now be understood how by the continued reciprocatory throw of the crank handle $e$ the lifting and depressing bars will be caused to reciprocate to the extent of their respective throws in both directions, and the plates be simultaneously shifted from one stack to the other; and it will be apparent that by the continuance of said operation any particular plate can be presented for exposure. It will of course be understood that all of the plate frames need not be supplied with plates.

As it is desirable at times to be able to present for a particular exposure a particular plate, each plate is preferably numbered upon its back, as shown in Fig. 6,—and as it is of advantage to provide means by which the photographer may, without opening the casing or admitting any light, know what plate is, at any particular time, actually presented for exposure,—I provide within a dial casing J applied to the exterior of the camera casing, and having no communication with its interior, an intermittently rotatable dial $j$ around the periphery of which are a series of numbers adapted to be presented *seriatim* through an opening $j^3$ in the casing, as the dial is caused to intermittently rotate. The intermittent rotation of the dial is easily accomplished by forming on the edge of the dial a series of ratchet teeth $j'$ correspondent in number with the numbers upon said dial, which latter are likewise correspondent in number with the numbers of the plates within the magazine,—and by providing upon the crank handle which, as described, is exterior to the casing, a spring pawl $j^2$ adapted in the throw of the handle to occasion the shifting of a plate, to encounter a tooth of the dial and rotate the latter a sufficient distance to expose a new number through the opening in the dial casing, which number will, by the proper loading of the magazine, indicate the plate exposed, and be free from the disadvantage of possible entrance of light appertaining to all indicating devices which have in whole or in part direct communication with the interior of the casing.

Having now described a good form of camera embodying my improvements it will be perceived that many advantages appertain to it. Thus, for instance, the mechanism for manipulating the plates is both simple and positive in its action, a single movement sufficing to effect the simultaneous transfer of two plates. Thus, again, the camera is perfectly light-tight with respect both to exposed and unexposed plates. Thus, again, any particular plate of the entire series may be quickly and certainly selected for exposure, the operator being provided with an indicating mechanism entirely upon the outside of the instrument which will unfailingly disclose the particular plate for the time being presented for exposure. Thus, again, while the magazine may be large enough to contain any desired total number of plates, yet the same magazine, by virtue of the adjustability of the false back and the flexibility of the bow springs, will be equally operative in connection with any particular number less than the possible total,—all of the plates of the series whatever be their total number being held tightly at all times and in all positions of the camera, and being positively controlled by the lever mechanism without any dependence upon a gravitative movement. Thus, finally, the loading and unloading of the magazine can be performed quickly and easily.

Having thus described my invention, I claim and desire to secure by Letters Patent—

1. A camera in which are combined the following elements:—a finder compartment;—an exposing compartment;—a magazine compartment to the rear of the two first-named compartments;—means for supporting within said magazine compartment, one above the other, two stacks of plates;—and a mechanism for simultaneously transferring one plate from each stack to the other stack, which consists of a rock shaft provided with rocker arms, a plate-depressing bar, a plate-lifting bar, and links connective of said rocker arms and said bars;—substantially as and for the purposes set forth.

2. A camera in which are combined a finder compartment and an exposing compartment located one above the other,—a magazine compartment to the rear of said first named compartments and of a height equal to their aggregate height,—means for supporting within said magazine compartment two stacks of vertically-disposed plates,—and a mechanism for simultaneously transferring one plate from each stack to the other stack, which consists of a rock shaft provided with rocker arms, a plate-depressing bar, a plate-lifting bar, and links connective of said rocker arms and said bars;—substantially as and for the purposes set forth.

3. A camera in which are combined the following elements:—a finder compartment;—an exposing compartment;—a focusing lens for the finder compartment;—a camera lens for the exposing compartment;—a lens-board common to both of the foregoing lenses;—means for adjusting the lens-board;—a magazine compartment to the rear of the two first named compartments;—means for supporting within said magazine compartment, one above the other, two stacks of plates;—and a mechanism for simultaneously transferring one plate from each stack to the other stack, which consists of a rock shaft provided with rocker arms, a plate-depressing bar, a plate-lifting bar, and links connective of said rocker arms and said bars;—substantially as and for the purposes set forth.

4. A camera in which are combined the following elements:—a finder compartment;—an exposing compartment;—a magazine compartment to the rear of the two first-named compartments;—means for supporting within said magazine compartment, one above the other, two stacks of plates;—means for maintaining the plates of each of the said stacks compactly together;—and a mechanism for simultaneously transferring one plate from each stack to the other stack, which consists of a rock shaft provided with rocker arms, a plate-depressing bar, a plate-lifting bar, and links connective of said rocker arms and said bars;—substantially as and for the purposes set forth.

5. A camera in which are combined the following elements:—a finder compartment;—an exposing compartment;—a magazine compartment to the rear of the two first named compartments;—lever compartments at the sides of the magazine compartment;—all of the said compartments being contained within an inclosing casing;—means for supporting within said magazine, one above the other, two stacks of plates;—means for maintaining the plates of each of said stacks compactly together;—and a plate manipulating lever mechanism which simultaneously transfers one plate from each stack to the other stack, and which is composed, essentially, of a rock shaft traversing the magazine compartment and operated from the exterior of the casing, of a plate-lifting bar and a plate-depressing bar both extending through the magazine compartment in parallelism with the rock shaft, and of a pair of rocker arms upon the shaft, each of which is connected by a pair of links with both the depressing bar and the lifting bar, and each of which in connection with its links is contained within one of the lever compartments;—substantially as and for the purposes set forth.

6. A camera in which are combined the following elements:—a finder compartment;—an exposing compartment;—a magazine compartment to the rear of the two first-named compartments;—means for supporting within said magazine compartment, one above the other, two stacks of plates;—mechanism for simultaneously transferring one plate from each stack to the other stack, which consists of a rock shaft provided with rocker arms, a plate-depressing bar, a plate-lifting bar, and links connective of said rocker arms and said bars;—and an automatic indicating mechanism upon the exterior of the camera, for indicating the plate exposed, which is operated from the exterior of the camera by a crank handle on the rock shaft;—substantially as and for the purposes set forth.

7. The combination to form a finder mechanism for a camera,—of a finder compartment having a hinged lid or cover provided as to its under face with an angularly-disposed supporting plate for eye-pieces, and with a mirror,—an inclined reflecting mirror upon the bottom surface of the compartment,—a vertically disposed reflecting surface at the rear of the compartment,—and an adjustable focusing lens at the front of the compartment,—substantially as and for the purposes set forth.

8. A plate-manipulating lever mechanism for a camera magazine, which consists of a rock shaft equipped with a pair of rocker arms,—a plate-depressing bar, a plate-lifting bar, and links respectively connective of said rocker arms and said bars,—substantially as set forth.

9. In combination with a magazine compartment of a camera, which is provided with means for supporting within it two stacks of vertically disposed plates, one above the other, and the side walls of which are provided with parallel pairs of slot-ways;—a plate-manipulating mechanism for simultaneously transferring one plate from each stack to the other stack, which consists of a rock shaft journaled transversely of the compartment and extending through its side walls,—a pair of rocker arms respectively applied to the respective side walls of the compartment,—a plate-depressing bar extending transversely through said compartment and projecting through a given pair of slot-ways,—a plate-lifting bar extending transversely through said compartment and projecting through a given pair of slotways,—and two pairs of links respectively connective of the rocker arms and the plate-depressing and plate-lifting bars, and, by pairs, located exterior to the said walls of the said compartment;—substantially as and for the purposes set forth.

10. In combination with a magazine compartment of a camera, which is provided with means for supporting within it two stacks of vertically-disposed plates, one above the other, and the side walls of which are provided with parallel pairs of slot-ways;—a plate-manipulating mechanism for simultaneously transferring one plate from each stack to the other stack, which consists of a rock shaft journaled transversely of the compartment and extending through its side walls,—a pair of rocker arms respectively applied to the shaft exterior to the respective side walls of the compartment,—a plate-depressing bar extending transversely through said compartment and projecting through a given pair of slot-ways, and provided with upwardly-extending wedge-shaped lugs;—a plate-lifting bar extending transversely through said compartment and projecting through a given pair of slot-ways, and provided with downwardly-extending wedge-shaped lugs;—and two pairs of links respectively connective of the rocker arms and the plate-depressing and plate-lifting bars, and, by pairs, located exterior to the said walls of the said compartment;—substantially as and for the purposes set forth.

11. In combination with a magazine compartment of a camera, which is provided with means for supporting within it two stacks of vertically-disposed plates, one above the other, also spring plate catches essentially such as set forth, and the side walls of which are provided with parallel pairs of slot-ways;—a plate-manipulating mechanism for simultaneously transferring one plate from each stack to the other stack, which consists of a rock shaft journaled transversely of the compartment and extending through its side walls,—a pair of rocker arms respectively applied to the shaft exterior to the respective side walls of the compartment,—a plate-depressing bar extending transversely through said compartment and projecting through a given pair of slot-ways, and provided with upwardly-extending wedge-shaped lugs;—a plate-lifting bar extending transversely through said compartment and projecting through a given pair of slot-ways, and provided with downwardly extending wedge-shaped lugs,—and two pairs of links respectively connective of the rocker arms and the plate-depressing and plate-lifting bars, and, by pairs, located exterior to the said walls of the said compartment;—substantially as and for the purposes set forth.

In testimony that I claim the foregoing as my invention I have hereunto signed my name this 20th day of July, A. D. 1894.

WM. DUFFIELD ROBINSON.

In presence of—
J. BONSALL TAYLOR,
F. NORMAN DIXON.